United States Patent [19]

Horlander

[11] Patent Number: 4,575,731
[45] Date of Patent: Mar. 11, 1986

[54] ELECTRO RESISTIVE PRINTHEAD DRIVE LEVEL SENSING AND CONTROL

[75] Inventor: Frank J. Horlander, Lexington, Ky.

[73] Assignee: International Business Machines Corporation, Armonk, N.Y.

[21] Appl. No.: 666,414

[22] Filed: Oct. 30, 1984

[51] Int. Cl.[4] .......................... G01D 15/10; B41J 3/20
[52] U.S. Cl. ................................ 346/76 PH; 400/120
[58] Field of Search .................... 346/76 PH; 400/120

[56] References Cited

U.S. PATENT DOCUMENTS

| 4,345,845 | 8/1982 | Bohnhoff et al. | |
| 4,375,339 | 3/1983 | Dyer et al. | 400/249 X |
| 4,390,884 | 6/1983 | Applegate et al. | |
| 4,425,569 | 1/1984 | Kawanishi et al. | 346/76 PH |
| 4,434,356 | 2/1984 | Craig et al. | 219/216 X |

OTHER PUBLICATIONS

*IBM Technical Disclosure Bulletin* Article Entitled "Resistive Ribbon Printhead Drive," by F. J. Horlander, vol. 26, No. 3A, Aug. 1983, at pp. 1161-1162.

*Primary Examiner*—E. A. Goldberg
*Assistant Examiner*—Gerald E. Preston
*Attorney, Agent, or Firm*—John A. Brady

[57] ABSTRACT

A voltage mode printhead drive for a resistive ribbon 20 employs sensing electrodes 7a contiguous to drive electrodes 1a through 1n. Electrodes 7a sense the return voltage, Vc, from the drive electrodes to ground. Electrodes 7a are mounted in and are a part of the printhead.

6 Claims, 2 Drawing Figures

ELECTRO RESISTIVE PRINTHEAD DRIVE LEVEL SENSING AND CONTROL

BACKGROUND OF THE INVENTION

1. Technical Field

This invention relates to driver circuits for thermal printheads employing a ribbon that generates localized heat in the ribbon in response to electrical current. The localized heat then serves to cause ink transfer to a receiving medium. Typically, the electrical signals are applied by printhead electrodes wiping across an outer layer of the ribbon which is characterized by moderate resistivity. These signals move inwardly to a layer that is highly conductive (typically an aluminum layer) with localized heating occurring in the process. The electrical circuit completed by an electrode connected to ground which intersects the ribbon. This invention is directed to an arrangement of sensing elements and control circuitry which provides excellent print quality while limiting power at the ribbon surface.

2. Background Art

This invention is premised on the finding that a voltage controlled system of the kind described in U.S. Pat. No. 4,345,845 to A. E. Bohnhoff et al is significantly improved in function by sensing the voltage at the printing area. In preferred aspects, the voltage is sensed at the printhead itself.

A printhead of the general kind preferred is described in U.S. Pat. No. 4,390,884 to Applegate et al. That shows drive electrodes as the only metal on the printhead. This invention employs surrounding metal as electrodes. The surrounding metal also functions to stiffen the printhead which is desirable.

DISCLOSURE OF THE INVENTION

The voltage at the conductive layer of a resistive ribbon is sensed through the resistive layer by electrodes mounted on the printhead. These sense the potential at the conductive return path, which is applied as one input to a differential amplifier. A feedback path to the other input of the amplifier applies the output voltage less a predetermined reference voltage.

The output drives each electrode through identical lines to each electrode. A fixed voltage is thereby applied across the ribbon, resulting in current which drops with imperfect contact between an electrode and the ribbon. This invention eliminates separate and more complex sensing elements.

The ribbon is operated at its approximate constant power region to further minimize the effects of imperfections in the system. Identical, individual resistors, each in series with one electrode, are selected in magnitude, along with the drive voltage levels, to achieve this. Such approximate constant power drive is described and claimed in this Applicant's previous U.S. application Ser. No. 593,052, filed March 26, 1984, and entitled "Regulated Voltage and Approximate Constant Power for Thermal Printhead."

BRIEF DESCRIPTION OF DRAWING

The details of this invention will be described in connection with the accompanying drawing, of which

BEST MODE FOR CARRYING OUT THE INVENTION

Figure 1:
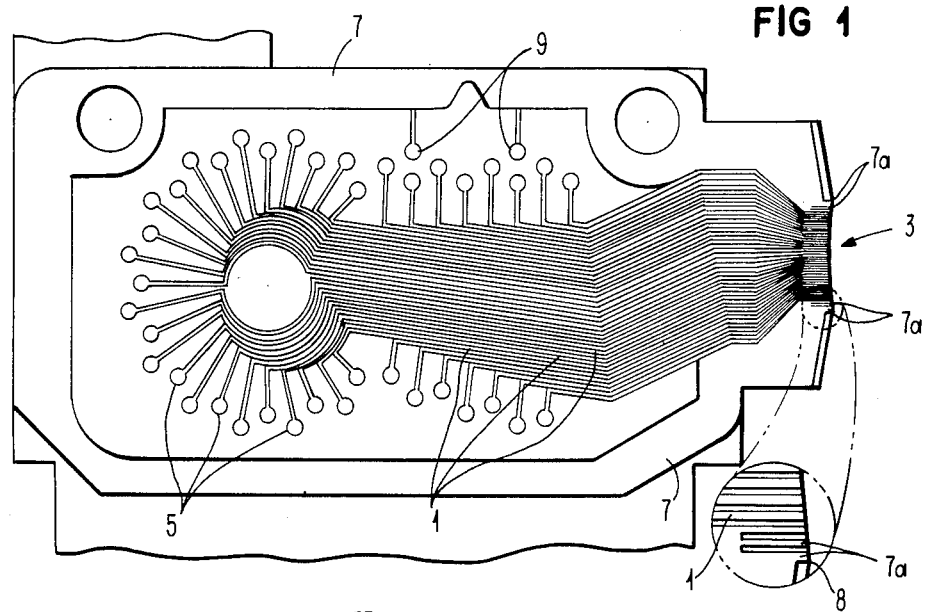
FIG. 1 illustrates the printhead with drive electrodes and surrounding metal employed as sensing electrodes and FIG. 2 is illustrative and schematic of the printing system.

FIG. 1 illustrates the actual metal layout of the preferred printhead. The ends of forty metal wires 1 function as forty substantially identical drive electrodes positioned in a column to form an arched printing surface 3. (The arched surface is to conform with the round platen surface against which paper to be printed upon is to be mounted, as is conventional.)

Each of forty wires 1 is separated from adjoining wires 1 and leads to an individual terminal 5. The outer metal 7 encircles wires 1 and terminals 5 except at printing surface 3, and is well spaced from terminals 5. That metal 7 is relatively wide to provide some shielding effect and structural support to the printhead. At the printing surface 3, metal 7 forms an extension 7a on both the top and bottom of the column of electrodes 1. Extensions 7a extend to the very edge of surface 3. Extensions 7a have a significant function as physical stiffeners. For purposes of this invention, extensions 7a function also as electrodes in the same manner as electrodes 1. In the vertical column formed by electrodes 1 and extensions 7a (see FIG. 1), the outer edges 8 (see FIG. 1 insert) of extensions 7a are typically spaced the distance of the vertical height of at least two to three electrodes 1, which assures that current spreading from active electrodes 1 does not effect voltage at electrodes 7a. Electrodes 7a on each side of electrodes 1 each are of vertical height substantially greater than that of the individual electrodes 1 to provide a reliable contact surface for sensing. Immediately next to electrodes 1, electrodes 7a have narrow parts closely similar in shape to individual electrodes 1, for the purpose of having the same stiffness around the outer electrodes 1 as the stiffness around inner electrodes 1.

To permit use of metal 7 as electrodes, terminals 9 are provided central to the printhead, which connect to metal 7 and are located between metal 7 and the closest of terminals 5. The duplication of terminals 9 is entirely to assure operation should one fail or not be contacted, since each is sufficient. Mounting of the element of FIG. 1 for operation is to a connection cable or the like, of which the foregoing U.S. Pat. No. 4,390,884 is illustrative.

Figure 2:
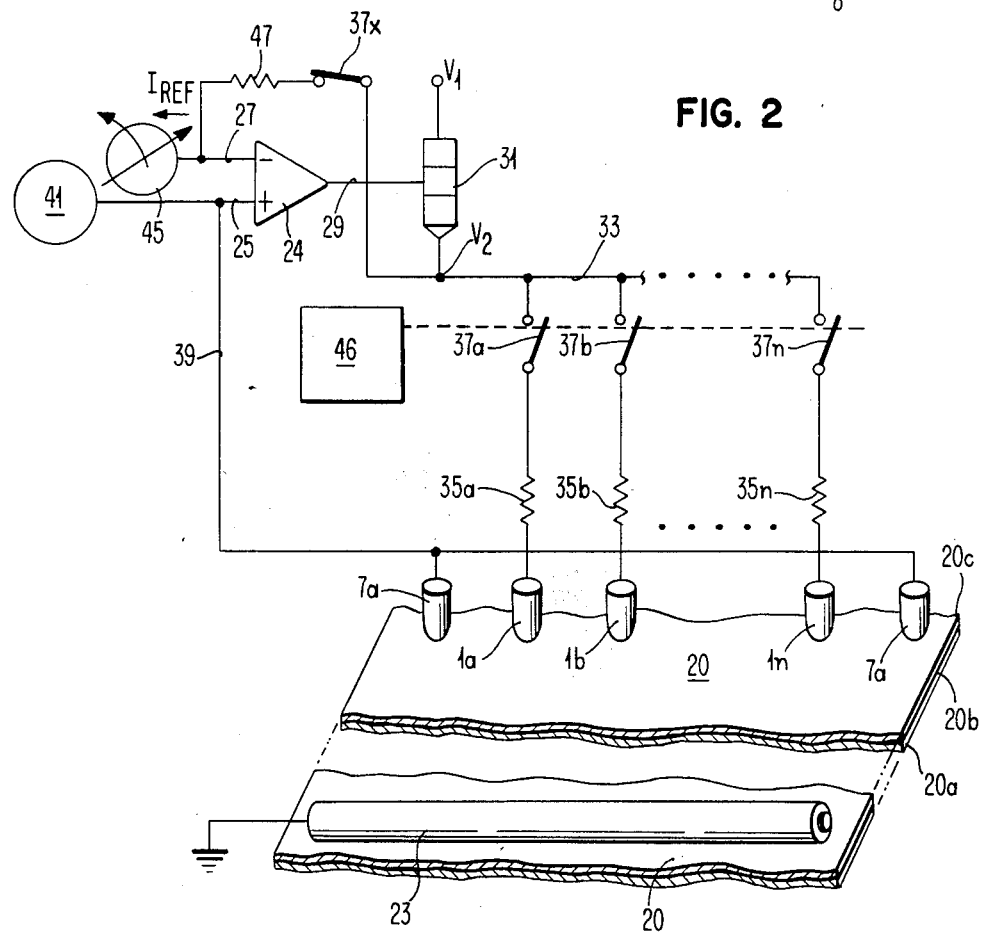

Referring to FIG. 2, the wires 1, operative at printing as electrodes, are shown symbolically, with individual electrodes numbered 1a, 1b through 1n. Electrodes 1a through 1n have current driven through them to ground for printing. Specifically, in a resistive ribbon embodiment of direct interest for this best mode, electrodes 1a through 1n are close together (specifically, as shown at surface 3 in FIG. 1) and in contact with a resistive ribbon 20, as is described in the foregoing U.S. Pat. No. 4,345,845. Each electrode 1a through 1n is metal having negligible resistance in this context of resistive ribbon printing. A ground connection, which may be a roller 23, typically is firmly pressed against the ribbon 20 on the same side contacted by electrodes 1a through 1n. (Typically, roller 23 carrying ground is one of two feed rollers spaced longitudinally along ribbon 20 from electrodes 1a through 1n.) Ribbon 20 from the side is shown illustratively in exaggerated form in FIG. 2. Ribbon 20 is a lamination of constant cross-section. Layer 20a, farthest from the electrodes, is the meltable ink. A thin internal layer 20b is a highly conductive layer, typically aluminum, which facilitates low-power conduction from areas directly across from electrodes 1a through 1n to ground roller 23. An aluminum layer 20b also inherently provides a thin, outer aluminum oxide surface which is relatively highly resistive. The resistive substrate 20c, typically a carbon black filled polycarbonate resin, is contacted by electrodes 1a through 1n.

On each side of the column of electrodes 1a through 1n are extensions 7a, also functioning as electrodes and in contact with substrate 20c.

Electrodes 1a through 1n are driven by operational amplifier 24, which functions as a differential amplifier as will be described. Amplifier 24 has a control input 25, which is the positive or plus input, and a reference input 27, which is a negative or minus input.

The plus and minus input designations are conventional, indicating that a rising signal on control input 25 is responded to by amplification providing a rising signal at the output 29 of amplifier 24. Conversely, a rising signal on reference input 27 is responded to by amplification providing a falling signal at output 29.

Amplifier 24, as a standard operational amplifier, provides reliable output with negligible input current on inputs 25 and 27. This facilitates overall circuit design and permits designs having a wide range of operability. It will be apparent, however, that amplifier systems having other characteristics can function for operational amplifier 24 so long as additional current flow and the like is compensated for or otherwise taken into account in each circuit design.

Output 29 drives the base of bipolar transistor 31. The emitter of transistor 31 is connected to line 33, and the collector of transistor 31 is connected to operating voltage V1, typically +38 voltage. Transistor 31 thus serves to provide current isolation between output 29 and line 33, with a small voltage potential drop inserted by the inherent forward biased base-to-emitter drop of transistor 31. It will be recognized that transistor 31 is a simplified implementation of a power amplifier, for example, a power field effect transistor or a Darlington pair of transistors.

Line 33 is connected to all of the electrodes 1a through 1n by identical, individual resistors 35a, 35b through 35n, each connected in series circuit between line 33 and one electrode 1a, 1b through 1n, respectively. Also in series circuit between electrodes 1a, 1b through 1n, is a switch 37a, 37b through 37n, respectively. (Switches 37a through 37n are illustrated entirely symbolically as such switches for the purpose of selecting electrodes may be standard. In an actual embodiment, they each include individual transistors or, more preferably, a Darlington configuration of transistors, switched off-and-on by a signal to the base or the equivalent control input to thereby open and close the path through switches 37a through 37n.)

The voltage drop across a switched-on transistor switch 37a through 37n is small because the circuit is designed to operate the pertinent transistors in switches 37a through 37n in saturation. To negate any effect on intended circuit operation from such a voltage drop, a switch 37x, identical to switches 37a through 37n, is connected between lines 33 and input 27. Because switch 37x is a compensating element as will be described, switch 37x is always closed and therefore is shown closed in the drawing.

Extensions 7a function as sensing electrodes and are located on each side of drive electrodes 1a through 1n. Electrodes 7a are connected together and directly to the plus input 25 of amplifier 24 by line 39. Source 41 is a constant-current source delivering a small current (typically 0.5 milliampere) to line 39. This serves as a current to continually bias the interface of electrodes 7a and ribbon 20 into a region of conduction, while the current is small enough to be insignificant with respect to printing. Failure of this current signals a complete lack of contact with the ribbon or a break in the ribbon, as is previously known. Source 41 is illustrated entirely symbolically as it may be entirely conventional.

V2 is the potential on line 33. Source 45 is an adjustable, constant-current source connected to reference input 27, which provides a current the same in polarity and direction as that provided by V2. Source 45 is illustrated entirely symbolically as such an adjustable current source is known as a control for electrode printing and forms no part of this invention. Resistor 47 is connected in series with switch 37x across input 27 to line 33.

The drawing is illustrative of a second print density control, a pulse width modulator system 46 to control the switches 37a through 37n. In such a system, each printing operation is conducted by those of switches 37a through 37n which are selected being rapidly alternated between opened and closed. To increase density, the closed period is lengthened with respect to the open period, which may be done by standard pulse width modulation techniques. To reduce print density, the open period is lengthened and the closed period is shortened. The advantage of density control by pulse width modulation system 46 is that ribbon 20 is operated at all density settings at the approximate constant power point, an advantage of operation discussed more fully below.

In operation, reference current source 45 is set at a level defining a level of current to electrodes 1a through 1n defining a desired extent of printing. (In resistive ribbon printing, increased current normally increases heat created in the ribbon and darkens printing.) By ordinary circuit laws, with a fixed current, Iref, from source 45, the potential at reference input 27, V27, is the potential on line 33, V2, less Iref multiplied by the resistance of resistor 47, R47, and the drop across switch 37x, V37, i.e.

$$V27 = V2 - Iref \cdot R47 - V37 \text{ (Formula A)}.$$

Since V27 is on the minus input of amplifier 24, when it is lower than the potential at the control input, V25, the voltage at output 29 increases immediately by action of amplifier 24. When V27 is higher than V25, the signal on output 29 immediately falls.

Equilibrium is reached early in each print operation after selection of electrodes 1a through 1n by selected ones of switches 37a through 37n. At equilibrium, the potentials V25 and V27 are equal since the system of amplifier 24 combined with the feedback signal through the resistor 47 is a differential amplifier. Expressed algebraically:

$$V25 = V27;$$

Substituting from Formula A:

$$V25 = V2 - Iref \cdot R47 - V37;$$

Rearranging algebraically:

$$V2 - V25 - V37 = Iref \cdot R47 \text{ (Formula B)}.$$

Since Iref·R47 is a constant for each density setting, during printing at that setting, V2−V25−V37 is a constant. Electrodes 7a carry V25. Electrodes 7a are located electrically at the origin of current from electrodes 1a through 1n flowing from conductive layer 20b to ground. (The 0.5 milliampere from source 41 creates a voltage between electrodes 7a and layer 20b, but this is negligible in magnitude.) Electrodes 7a therefore measure the voltage from along the length of the ribbon to ground. This is often termed the common voltage, Vc. V2−V25 therefore is the voltage from V2 to the conductive layer 20b across ribbon 20.

Changes in V37 change V2, but such changes do not affect printing since the voltage across closed switches 37a through 37n changes substantially identically to any change across switch 37x and only the voltage across ribbon 20 controls printing. Accordingly, change in V37 may be considered fully compensated and V37 may be considered a constant. Rearranging Formula B: V2−V25=Iref·R47+V37. Accordingly, this system applies a fixed voltage defined in Formula B across each series circuit of a fixed resistor, for example, resistor 35a, a closed switch, switch 37a, an electrode, electrode 1a, and across the ribbon 20 to the ground return path. The resistance and other voltage-reductions effects of the switch 37a through 37n and the electrodes 1a through 1n typically are not significant and are identical for each path from line 33. Accordingly, current through each driven electrode 1a through 1n will typically vary from that of the others only by differences in voltage losses at the interface between electrodes 1a through 1n and ribbon 20. Such interface effects can be significant, since they result from imperfect contact between an electrode 1a through 1n with the ribbon, which typically does occur periodically.

The voltage directly across the ribbon, Va, is often termed the through voltage. Va produces the heating effect for printing. The voltage drop Vc along the length of ribbon 20 to ground is typically much smaller than Va. Typically, the ribbon has an internal metal or other highly conductive layer 20b, thereby facilitating conduction along the ribbon to ground roller 23 and keeping Vc low.

Vc varies significantly with the number of electrodes 1a through 1n driven. Such variation is sensed by electrodes 7a, changing the input V25 to amplifier 24 directly with those changes, thereby changing V2 on line 33 the same magnitude and in the same sense. Accordingly, where interface voltages are the same, the same current is applied through each driven electrode 1a through 1n regardless of shifts in Vc. Va is a function of the electrical characteristics across ribbon 20 and is typically the same throughout a specific ribbon 20. Should a significantly poor contact develop between one or more electrode 1a through 1n being driven and ribbon 20, the voltage from line 33 to conductive layer 20b remains constant. Current through the electrode 1a through 1n experiencing poor contact decreases, thereby inherently avoiding excessive currents which can damage the ribbon 20 and the area around the printing surface 3 of the printhead.

The level of V2 and resistors 35a through 35n, which are of identical resistivity, are selected to be within desired operating characteristics of the ribbon 20 or other medium driven by electrodes 1a through 1n to achieve approximate constant power. These constant power aspects are essentially identical to that described and claimed in the foregoing application Ser. No. 593,052, filed Mar. 26, 1984, by the inventor of this application. Briefly, the magnitude of V2 and resistors 35a through 35n is selected to achieve the approximately constant power. Delivery of constant power produces more uniform printing operation and limits current flow. Current fluctuations are reduced, which reduces arcing tendencies.

Each resistor 35a through 35n is selected to be equal to the nominal effective resistance into each of the electrodes 1a through 1n. (The nominal effective resistance is, of course, identical for all the electrodes 1a through 1n.)

Each ribbon 20 has a characteristic curve, illustrated in the foregoing application Ser. No. 593,052, of response to Va which is relatively slow-changing at regions past low currents. The normal operation point is selected to be in that slow-changing region. Each resistor 35a through 35n is selected to provide a voltage drop the same as the drop Va at the nominal point. This achieves approximately constant power for moderate changes in operation, as is described in detail and justified mathematically in the foregoing application Ser. No. 593,052.

The essential novelty described and claimed here is in incorporating the Vc sensing electrode into the printhead. Operation has been found to be entirely effective and satisfactory, while the need for a separate, spaced electrode is avoided. Modifications within the concepts and spirit of this invention necessarily are available.

What is claimed is:

1. A printhead supporting electrodes including a plurality of printing electrodes for carrying driving current for printing, said printhead having integrally therein at least one sensing electrode for sensing voltage on a ribbon being printed from by said printing electrodes, each said sensing electrode being separated from said printing electrodes and connected to an electrical control circuit for setting the level of drive current to said printing electrodes.

2. The printhead as in claim 1 in which said electrical control circuit comprises a differential amplifier with said connection being to one input of said differential amplifier, said connection also being connected to a current source to supply a substantial current of magnitude insignificant with respect to printing.

3. A printhead having in the order of magnitude of forty printing electrodes for carrying driving current for printing and a sensing electrode on each side of said printing electrodes, said printing electrodes and said sensing electrodes being in a column, and a connection to said sensing electrodes for an electrical control circuit for setting the level of drive current to said printing electrodes.

4. The printhead as in claim 3 in which said electrical control circuit comprises a differential amplifier with said connection being to one input of said differential amplifier, said connection also being connected to a current source to supply a substantial current of magnitude insignificant with respect to printing.

5. A resistive ribbon printer comprising a printhead having a plurality of printing electrodes for carrying driving current to a resistive ribbon for printing, a sensing electrode mounted within said printhead for sensing voltage by contact with the surface of said resistive ribbon, a differential amplifier, means connecting said sensing electrode to one input of said differential amplifier, and means connecting the output of said differential amplifier in series circuit with said printing electrodes to drive said printing electrodes for printing by said resistive ribbon.

6. The printer as in claim 1 also comprising a constant current source for providing current of magnitude insignificant with respect to printing and means connecting said current source to said one input.

* * * * *